United States Patent
Hammer et al.

(10) Patent No.: US 6,795,748 B2
(45) Date of Patent: Sep. 21, 2004

(54) INPUT METHOD FOR PROGRAMMING INDUSTRIAL CONTROLLERS

(75) Inventors: Josef Hammer, Heroldsbach (DE); Peter Nagy, Budapest (HU); Holger Grzonka, Erlangen (DE); Rolf Bluemel, Elsterwerda (DE)

(73) Assignee: Siemens Aktiengesellschaft, Munich (DE)

( * ) Notice: Subject to any disclaimer, the term of this patent is extended or adjusted under 35 U.S.C. 154(b) by 305 days.

(21) Appl. No.: 09/838,803

(22) Filed: Apr. 20, 2001

(65) Prior Publication Data

US 2002/0022905 A1 Feb. 21, 2002

(30) Foreign Application Priority Data

Apr. 10, 2000 (DE) .......................................... 100 17 775

(51) Int. Cl.$^7$ ............................................... G06F 19/00
(52) U.S. Cl. .......................... 700/181; 700/18; 700/253
(58) Field of Search .............................. 700/18, 17, 61, 700/63, 69, 83, 86, 180, 181, 184, 186–188, 56, 253; 318/567, 568.1, 573; 345/762–763; 717/105–106, 109

(56) References Cited

U.S. PATENT DOCUMENTS

| | | | |
|---|---|---|---|
| 3,668,653 A | | 6/1972 | Fair et al. |
| 4,074,281 A | | 2/1978 | Quarton |
| 4,646,228 A | | 2/1987 | Ikeda |
| 4,682,278 A | | 7/1987 | Marquardt et al. |
| 4,835,700 A | * | 5/1989 | Tanaka et al. ............... 700/181 |
| 4,837,722 A | | 6/1989 | Sara |
| 4,852,047 A | | 7/1989 | Lavallee et al. |
| 5,321,603 A | | 6/1994 | Schwenke |
| 5,392,207 A | * | 2/1995 | Wilson et al. ................ 700/64 |
| 5,434,489 A | | 7/1995 | Cheng et al. |

(List continued on next page.)

FOREIGN PATENT DOCUMENTS

| | | |
|---|---|---|
| DE | 196 00 882 C1 | 9/1997 |
| DE | 196 00882 C1 | 9/1997 |
| EP | 0 774 701 A1 | 11/1995 |
| EP | 0735444 A2 | 2/1996 |
| EP | 0 735 444 A2 | 3/1996 |
| EP | 0774701 A1 | 5/1997 |
| EP | 0 813 131 A1 | 6/1997 |
| EP | 0813131 A1 | 12/1997 |
| WO | WO 92/02871 | 2/1992 |
| WO | WO 97/25661 | 7/1997 |

OTHER PUBLICATIONS

Einfach und werkstattnah programmieren G05B 19/409 TR Technische Rundschau Heft 37 1993.

"NC/CNC Handbuch", Hans B. Kief, Carl Hanser Verlag Publishers, Munich, 1995, Forward, and pp 296–297 and 318–319.

Josef Hubl, SPS/IPC/Drives—tagungsband, pp. 88–95, Nov. 23–25, 1999, Nurnberg, Verlag Huthig GmbH, Heidelberg, Germany.

"ISaGRAF Overview" by AlterSys Inc., Mar. 2001; http://web.archive.org/web/20010303035642/www.altersys.com/02 products/02 isagraf/index.asp.

"Siemens Industrial Software" by E&M Products, Apr. 2001; http://web.archive.org/web/20010426043029/http://www.enm.com/products/siemensindsoftware.asp.

(List continued on next page.)

Primary Examiner—Ramesh Patel
Assistant Examiner—Ronald D Hartman, Jr.
(74) Attorney, Agent, or Firm—White & Case LLP

(57) ABSTRACT

A method for programming axial movements and events for industrial controllers is disclosed. A user may use an input device to enter axial movements and events into an electronic computer system, and thereafter generate controller language or code. The language or code may be used to operate the controller.

4 Claims, 7 Drawing Sheets

U.S. PATENT DOCUMENTS

| | | | | |
|---|---|---|---|---|
| 5,479,354 A | * | 12/1995 | Husslein | 700/180 |
| 5,563,526 A | | 10/1996 | Hastings et al. | |
| 5,790,437 A | * | 8/1998 | Schuh et al. | 702/68 |
| 5,909,372 A | * | 6/1999 | Thybo | 700/83 |
| 5,926,176 A | | 7/1999 | McMillan et al. | |
| 6,055,369 A | | 4/2000 | Sawahata et al. | |
| 6,144,984 A | | 11/2000 | DeBenedictis et al. | |
| 6,167,328 A | * | 12/2000 | Takaoka et al. | 700/264 |
| 6,282,699 B1 | | 8/2001 | Zhang et al. | |
| 6,289,252 B1 | | 9/2001 | Wilson | |
| 6,294,891 B1 | * | 9/2001 | McConnell et al. | 318/619 |
| 6,295,606 B1 | | 9/2001 | Messerges et al. | |
| 6,412,106 B1 | | 6/2002 | Leask et al. | |
| 6,442,442 B1 | * | 8/2002 | Weinhofer | 700/86 |
| 6,466,827 B1 | | 10/2002 | Stine | |
| 6,553,268 B1 | | 4/2003 | Schwenke et al. | |
| 6,571,138 B1 | * | 5/2003 | Okada et al. | 700/83 |

OTHER PUBLICATIONS

"PLCopen: Standardization in Industrial Control Programming" by Eelco van der Wal.

"ISaGRAF Target for QNX6" by Pavel Kabanov, Nautsilus Scientific Center, 2001; http://www.nautsilus.ru/engl/isagq6–e.htm.

Hans B. Kief, NC/CNC Handbuch, 2000, Carl Hanser Verlag Publishers, Munich, Germany, p. 244; p. 254, Bild 7:Programmiermögilchkelten von SPS, p. 320, p. 326, Bild 5: Das Prinzip der maschinellen NC–Programmierung; p. 327, Bild 6: Prinzip und Informationsttuβ bei der rechneunterstützten (maschinellen) NC–Programmierung.

DIN 66001, "Information Processing Graphical Symbols and Their Application," Deutsches institut für Normung, Dec. 1983.

Einfach und werkstattnah programmieren G05B 19/409, TR Technische Rundschau Heft 37, 1993, pp. 70–71.

Hans B. Kief, NC/CNC Handbuch, 1995, Forward and pp. 296–297 and 318–319, Carl Hanser Verlag Publishers, Munich, Germany.

* cited by examiner

| Synchronization points | Description | Use |
|---|---|---|
|  | neither master position nor slave position is given:<br>- immediately | increasing synchronization |
|  | master position is given:<br>- on master reference | increasing synchronization |
|  | master and slave positions are given:<br>- on master and slave reference,<br>- immediately with reference,<br>- next with reference | increasing synchronization |
|  | neither master position nor slave position is given:<br>- immediately | decreasing synchronization |
|  | master position is given:<br>- on master reference | decreasing synchronization |

FIG 4

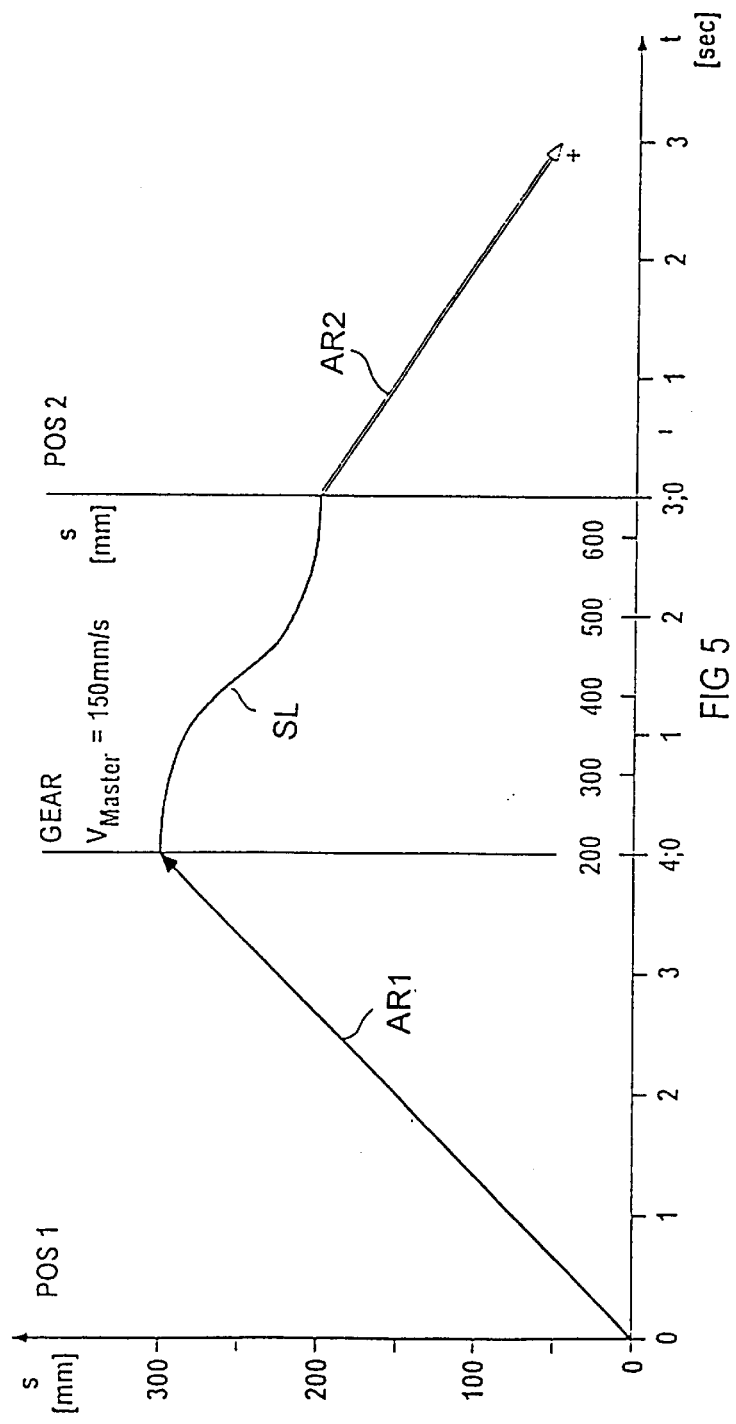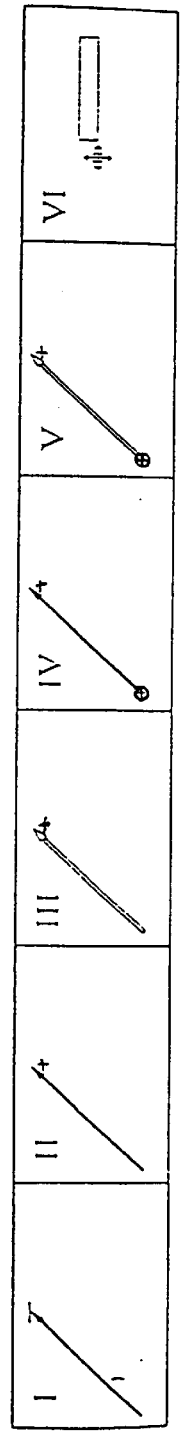
FIG 5
FIG 6

INPUT METHOD FOR PROGRAMMING INDUSTRIAL CONTROLLERS

FIELD OF THE INVENTION

The present invention is directed to an input method for programming axial movements and events for industrial controllers.

BACKGROUND

It is known that graphical input devices and a display screen can be used for graphically visualizing elements of a control procedure of an industrial process system and for controlling the movements of a processing machine. For example, see Hans D. Kief: "NC/CNC Handbuch" [NC/CNC Handbook] 1995/96, Hanser Verlag, page 297, Figure 1 and page 318, Figure 3. Thus, for example, a user may graphically input and vizualize geometric and/or technical information. These graphics, which, for example, visualize the geometry of a workpiece; are used directly for programming the controller.

In the case of traditional machine tools, programming issues have less to do with machining a workpiece than with the interaction of two or more axes for the implementation of a desired production process. Different functions of the production process can be handled by the controller. Control of different functions is thereby enabled including, positioning, synchronization, and cam behavior, as well as the integration of time and path conditions and events and combinations thereof.

Input methods today depend primarily on the electrical or electronics engineer who converts given engineering problems into a programming language that can be understood by the controller. The conceptual viewpoints of a mechanical engineer, i.e., a machine designer, however, is poorly supported by traditional programming solutions. Therefore, an object of the present invention is to make available an input method that supports the approach of the mechanical engineer and thus greatly simplifies data input for the user.

SUMMARY OF THE INVENTION

According to the present invention, this object is achieved for a method comprising the following steps:
a) editable blank diagrams for path-time curves for one axis at a time and/or path—path relationships for pairs of leading axes and following axes are visualized for the user;
b) the path and time limits and/or path and time units are defined as needed;
c) the path-time curves and/or the path—path relationships are entered into the diagrams using the input devices;
d) the control program and/or the control code for the production process are subsequently generated by the controller;
where edited changes in the control program or in the control code are both active and retroactive.

An important advantage of the claimed input method for programming axial movements and events in industrial control systems is that it supports the thought processes of a mechanical engineer, who is thinking about abstract axial movements and movement processes. Using the claimed method, especially with regard to programming movement controls, a user can easily enter the path-time curve of axial movements into path-time diagrams. With the help of manual input devices, the user can easily enter the relationships between leading axes and following axes in path—path diagrams. The inputs are then visualized within previously defined path and/or time limits. The user is thus able to concentrate on path and time intervals, and therefore can focus on small sections when programming complex movement processes. In addition, the user can select the best path and/or time units when labeling the abscissa and ordinate of each blank diagram.

The user can visualize the movements of different axes of the same machine in separate diagrams. This ability facilitates the programming process because the user can process the movement sequences of one axis and the relationships of the leading axis and the following axis separately and in succession.

Another advantage of the present invention is that different types of axial movement such as axial positioning, synchronous operation or curve synchronization can be represented in the same type of diagram.

Another advantage of the present invention is that, after inputting path-time curves of the respective axes and/or inputting path—path relationships for pairs of leading and following axes, a corresponding control language and control program and/or control code for the controller can be generated automatically from the diagrams. Generation of code in a programming language that can be understood by the controller is therefore part of the system output. The control language may be in the form of a higher programming language or it may be in a graphic form (e.g., a flowchart).

Another advantage of the present invention is that the user is supported in traditional forward engineering by a completely integrated toolkit:
the above-mentioned input method;
controller language; and
controller code.

In addition, any revisions made by the user in a later phase are automatically incorporated into earlier entries. In this way, the user is supported in round-trip engineering, i.e., changes made by an electrical engineer at the programming level (at the level of the controller language) are included in a diagram for the mechanical engineer (said input method). Thus, consistency in both directions is ensured at all levels.

In an embodiment of the present invention, axial positioning sections and/or axial synchronous sections may be entered for path-time curve diagrams. Thus, the user has the option of having the chronological sequence of positioning and synchronous curves presented in one diagram, i.e., to see everything visualized at once. Another advantage of this joint representation is that the respective derivatives (speed, acceleration and rate of change) can be calculated and visualized on the basis of this diagram.

In another embodiment of the present invention, symbols representing events and control instructions for the path-time curves and/or the path—path relationships, are entered into the diagrams with the help of an input device. Therefore, an axial movement can be represented as a response to an external event, and furthermore, a complex and/or dependent axial process can be modeled by the introduction of control instructions or logical conditions.

In another embodiment of the present invention, control information contained in an event or control symbol, can be visualized via an input device in a partial image or a subfigure correlated with a diagram. Thus, additional detailed information relevant in the current stage of work is available to a user in a simple and ergonomic manner.

In another embodiment of the present invention, first, second, and/or third derivatives of a path-time curve, may be visualized on a display screen at the control end. Verification of the dynamic response of the controlled axis can be monitored through this representation of the speed, acceleration and rate-of-change diagrams. In other words, the system knows the physical limits of each axis and simply does not allow movement processes that would extend outside these physical limits.

In another embodiment of the present invention, a derivative may be determined and visualized via an action from the input device, and any effect of that derivative on another derivative or on an output path-time curve for the controller may also be visualized. Thus, the user has the option of further optimizing the derivatives generated by this system according to the movement function via an interactive process utilizing an input device. The effects of a modification entered by a user on another derivative and on the output path-time curve and on an axis are promptly visualized on the control end after the input is complete. In this way, the user can visually and immediately evaluate the effects of any changes made.

In another embodiment of the present invention, some or all of the path-time curves can be visualized in a time-synchronous manner in a subfigure or partial figure, and can be correlated by using an input device. Thus, the user has the option of evaluating the path-time curves of all axes, or a subset thereof, in an overall diagram with a time-synchronous display. The user can thus clearly see where the axes are located in the system at any given time. Then, with the help of the input device, the user can easily specify a synchronous start of movements of multiple axes. The user thus has the option of introducing further optimization of the movement.

In another embodiment of the present invention, some or all of the path—path relationships can be vizualized. The user can thus view all the path—path relationships of the leading axis and the following axis which are present in the system or a subset thereof in an overview diagram.

In another advantageous embodiment of the present invention, a context-specific toolbar may be provided for the user, with various symbol elements available for entering path-time curves and/or path—path relationships. Using a keyboard, mouse, light pen or other input device, the user can operate the toolbar and generate axial curves very rapidly. The dependence on context increases efficiency of the user because the symbolic elements available to the user at any time are only those which he would in fact logically need in the current situation.

In another embodiment of the present invention, points and/or ranges of a qualitatively predeterminable synchronicity can be entered for path—path relationships. Thus, the user has an opportunity to define points for the beginning of increasing or decreasing synchronization within the diagram for the path—path relationships of the leading axis and the following axis with the help of an input device. The synchronization ranges (from the beginning to the end of the increasing or decreasing synchronization) are calculated by the system on the basis of the defined relationships and are plotted graphically in the corresponding section of the abscissa where the movement of the leading axis is described. Through this graphic capability, a user can get a very good idea of the synchronicity of the axes involved in a movement sequence, and can introduce further optimization on the basis of such information.

In another embodiment of the present invention, any desired relationships of up to three parameters inherent in the system, instead of or in addition to path-time curves and/or path-time relationships, can be vizualized in a blank diagram. In addition to such quantities as path and time typically used in these types of diagrams, it is also possible, for example, to vizualize pressure variations in an installation over time.

In another embodiment of the present invention, there may be automatic monitoring and/or vizualize of violations of limits in the path-time curves and/or the path-time relationships. Such monitoring and verification function inherent within the system removes a burden from users as they need not perform these functions themselves, but instead can concentrate on their actual engineering activities.

Advantages of the present invention thus consist in particular of the ability for a user to formulate movement relationships of axes in graphic working diagrams. This feature makes it possible to introduce a stronger mechanical engineering-oriented viewpoint into the programming of machine tools. Machine designers and mechanical engineers who think very much in terms of path-time diagrams or path—path relationship diagrams can thus create programs for process control, and, in particular, for movement control in an efficient manner. In particular, the efficiency of this type of programming is increased by the fact that the programs for the controllers are automatically generated from the diagram inputs. In addition, these diagrams are also highly suitable for guaranteeing uniform and unambiguous communication between the mechanical engineer and the electrical engineer.

BRIEF DESCRIPTION OF THE FIGURES

One embodiment of the present invention is described with reference to the figures, wherein:

FIG. 4 shows possible synchronization points for path—path relationships in the form of a table together with a brief description of each element;

FIG. 5 shows a diagram of the path-time curve with two positioning sections and a synchronous section in between the positioning sections;

FIG. 6 shows input symbols for the positioning sections in path-time diagrams;

DETAILED DESCRIPTION OF THE INVENTION

Figure 1:
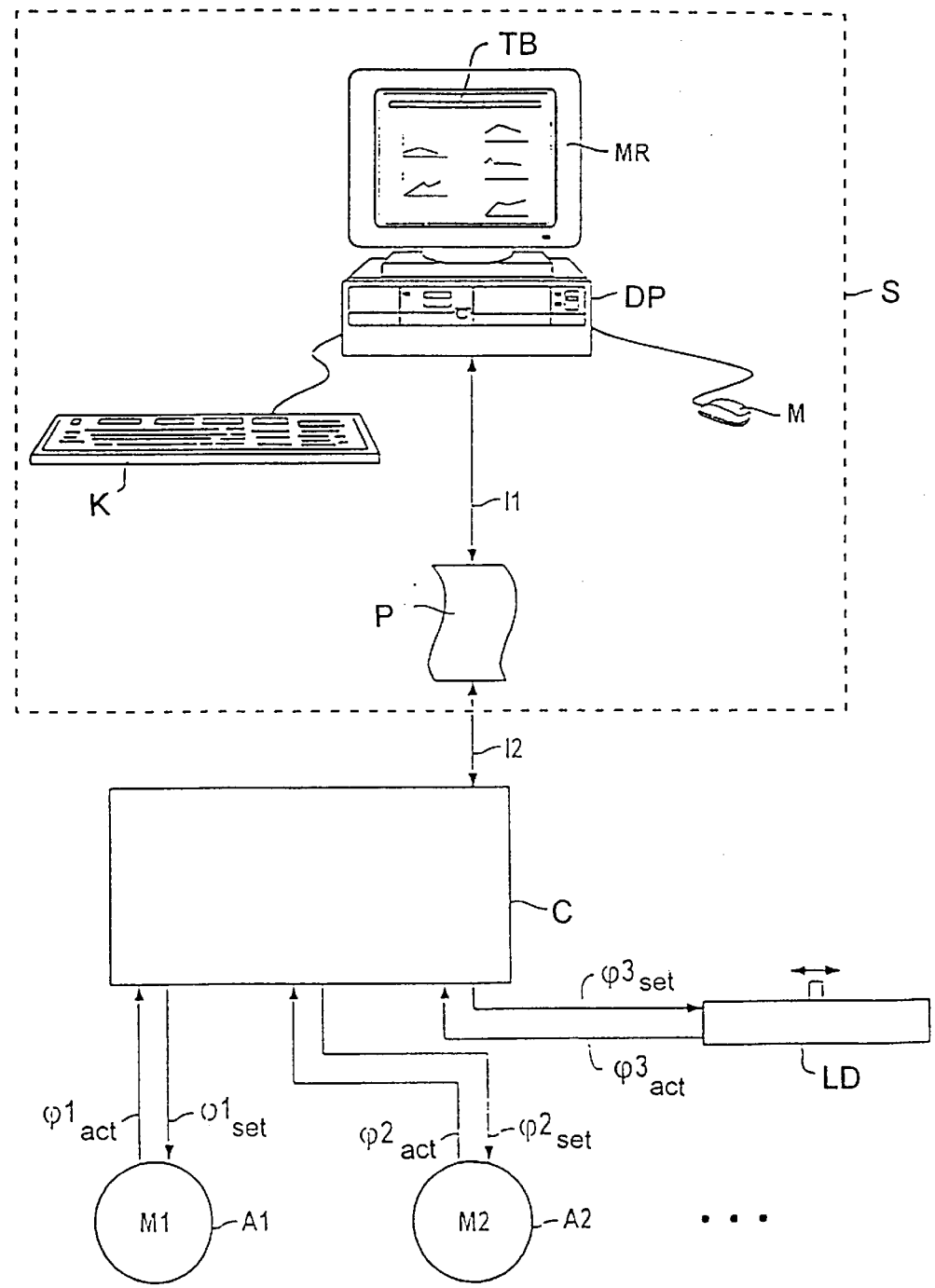
FIG. 1 shows an overall scheme indicating possible controller programming connections as well as the connections of the controller to devices of an industrial process system.

FIG. 1 shows an overview of the connection of a controller C to an industrial process system (peripherals, motors, etc.) as well as to a development system on a computing system S (e.g., a PC). FIG. 1 shows the elements of computing system S within the dotted line. Control program P is also illustrated within the dotted line because it is generated on the computing system. Usually, the control program P (in text or graphic form) is supplied to a controller C, in particular for controlling movement sequences. This control program P is created on a computing system S and loaded into controller C over bi-directional information path I2. Generating a control program P on computing system S and loading the control program into controller C through information path I2 is a typical procedure.

Controller C may be partially or entirely integrated into the computing system S. Input means of computing system S may include a keyboard K and a mouse M. A monitor MR is used to visualize user inputs and to vizualize computation results. A toolbar TB is available to the user as a visual input device which the user can use with the help of a mouse M. Instead of a mouse M, it is, of course, also possible to use another device such as a light pen, a touch sensor, etc. Information processing within the computing system S takes place in the data processing unit DP.

The programming of machine tools using a control language or with a control program primarily supports the viewpoint of an electrical or electronic engineer. To support the thought processes of a mechanical engineer, a user can generate a path-time curve of an axis, or path—path relationships of multiple axes, by using the input device, and visualizing these relationships on the monitor MR. The graphical user input is converted by computing system S into a control program P, i.e., the user input is converted into a control program P over information path I1. Further transmission to controller C takes place over information path I2. A compiler generates an executable control code from the control program P. Changes to the control code are automatically implemented in the control program and in the input diagrams, and changes in the control program are implemented in the input diagrams and in the control code. Therefore, information paths I1 and I2 are both shown as bi-directional. Computing system S can also obtain current information regarding the status of the industrial process system from controller C over information paths I1 and I2.

FIG. 1 shows examples of several devices which may be used to control a technical process: two drives A1, A2, with motors M1 and M2, and a linear motor LD. Controller C receives information about the current status ($\phi1_{act}$, ($\phi2_{act}$ and ($\phi3_{act}$ of these devices. Each instrument is supplied with set points ($\phi1_{set}$ through ($\phi3_{set}$ by controller C. FIG. 1 is an extremely simplified design of an industrial process system for the sake of simplicity. Although FIG. 1 shows three devices operated by controller C, it will be understood that fewer or additional devices may be operated by controller C.

Figure 2:
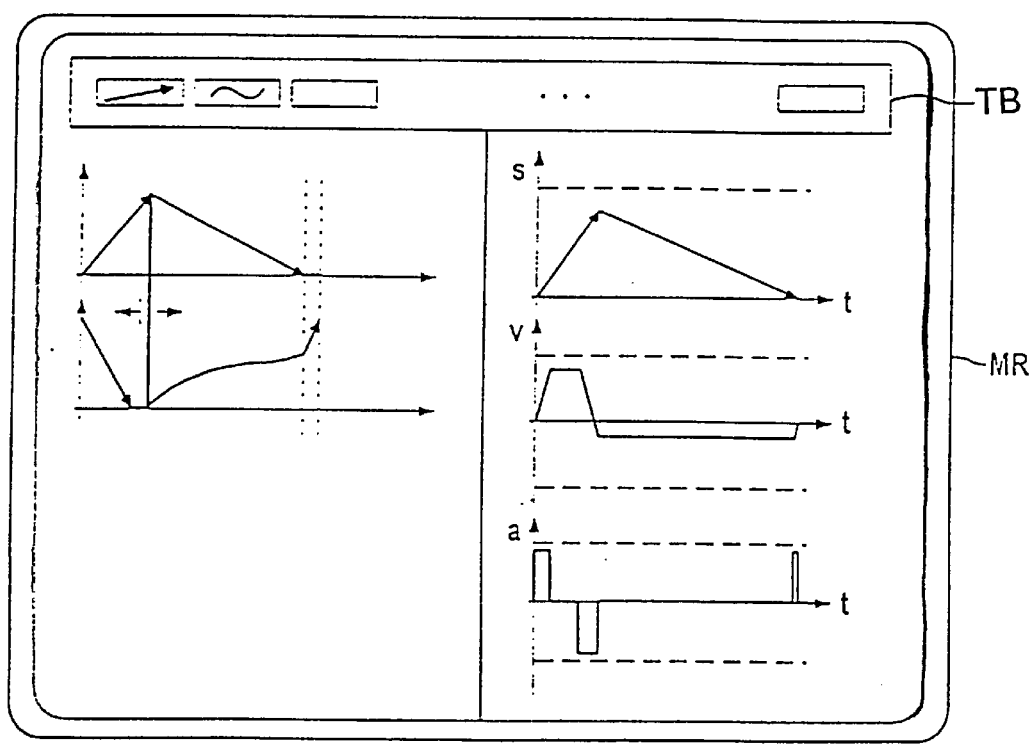
FIG. 2 shows a monitor image with the path-time curve of an axis and diagrams derived from the curve.

FIG. 2 shows a portion of a display screen on monitor MR displaying an overall path-time curve diagram and three derivative diagrams visualizing distance, velocity and acceleration.

A user may input any desired number of path-time curves and generate the corresponding velocity, acceleration and/or rate-of-change diagrams. To get an impression of the overall status of the system and yet not lose the overall perspective, a user may select to visualize some or all of the path-time curves in one overall diagram. The left side of FIG. 2, displaying the left part of monitor MR, shows an example of such an overall diagram, shown here with two curves. Vertical auxiliary lines (continuous and dotted lines) illustrate corresponding time ranges. The pair of horizontal arrows shown on the solid auxiliary line indicates that it can be edited, as discussed in greater detail below.

The right side of FIG. 2 shows monitor MR displaying a diagram for a path-time curve s=f(t) for a simple process, as well as diagrams v=f'(t) and a=f''(t) derived from the path-time curve s=f(t).

The lower-positioned diagrams for velocity v=f'(t) and acceleration a=f''(t) are automatically generated by the system from the path-time diagram s=f(t). In the axis labels of these diagrams, t denotes time, s denotes distance, v is velocity and a represents the acceleration. In addition, it is also possible to generate and visualize the rate of change r=f'''(t) from the path-time curve s=f(t) of an axis.

Toolbar TB is shown at the top of the display screen of monitor MR in FIG. 2. Although the toolbar may be moved to any other desired location on monitor MR by the user, tool elements found on the toolbar may comprise functions such as linear movements (indicated by an arrow), looping (indicated by a sine curve) and many other functions which can be described by blank fields and three points.

Figure 3:
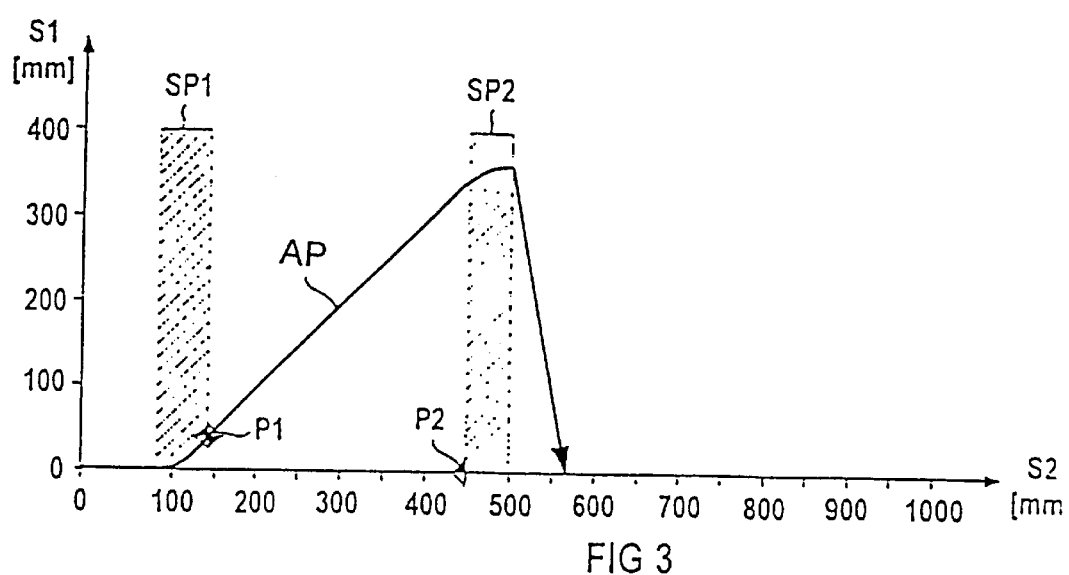
FIG. 3 shows a diagram illustrating path—path relationships with synchronization points and synchronization phases.

FIG. 3 shows path—path relationships with synchronization points P1 and P2 and synchronization phases SP1 and SP2. The path—path relationship of two axes S1 and S2 is shown in mm distances in the Figure. The curve of the resulting path—path relationship of axes S1 and S2 is illustrated by line AP. With the help of path—path diagrams, master-slave relationships of axes, i.e., relationships between a leading axis and a following axis, can be clearly illustrated. The width of a synchronization range is indicated with hatched lines in the Figure. Synchronization point P1 indicates the start of the synchronous phase between the two axes S1 and S2. The width of increasing synchronization phase SP1 is automatically calculated and vizualized by the system. Synchronization point P2 indicates the end of the synchronous phase and the start of decreasing synchronization phase SP2. The length of decreasing synchronization phase SP2 is automatically calculated by the system. Details regarding the synchronization times are explained in greater detail below in conjunction with the discussion of FIG. 4. Calculation of the width of a synchronization range takes into account dynamic settings such as the master velocity, the gear factor, the maximum acceleration and the velocity profile.

FIG. 4 shows synchronization points available to a user described in tabular format. The left column in FIG. 4 shows the tools available to a user for synchronization of axes, i.e., for modeling the synchronization. The symbols represented in the left column in FIG. 4 can be used as descriptive elements by a user to model the axial synchronization, for example, as illustrated in FIG. 3. These synchronization points can be made available to a user via toolbar TB, shortcuts or similar implementations.

Row 1 of the table shows that a synchronization point indicated by an open triangle can be used for the purpose of increasing synchronization, used for points at which neither master nor slave positioning is given. Such a situation can be described as "immediately." The next row illustrates a case where the master position is given, represented by a half-filled triangle, also for the purpose of increasing synchronization. Such synchronization can be referred to as "on master reference."

A third possibility for increasing synchronization is indicated in the middle row of the table, where a black and white checked square illustrates a situation where the master and slave positions are given. This is a case of "on master and slave reference,""immediately with reference" and "next with reference."

For the case of decreasing synchronization, synchronization points can also be given for the situation in which neither master nor slave position is given, i.e., the condition "immediately." In this case, an indication of the synchronization point is indicated with a hollow left-pointing triangle. Likewise for the case when the master position is given, i.e., "on master reference," a synchronization point may be indicated for a half-filled triangle pointing to the left since this is a case of decreasing synchronization.

FIG. 5 shows the path-time curve s=f(t) of one axis. The time t (unit: seconds) is plotted on the abscissa, and the path or distance s (unit: millimeter) is plotted on the ordinate. The diagram consists of two positioning sections, POS1 and POS2, as well as a synchronous section or synchronization section GEAR in between them. The three sections (POS1, POS2 and GEAR) are separated by vertical lines. Each section has its own scale on the abscissa, beginning at zero for each section. However, it is also possible to use a single scale continuing over all three sections. In the synchronous section GEAR, the abscissa has a second scale (labeled above the axis). This second scale depends on the respective master axis.

FIG. 5 illustrates the axial positioning in the first positioning section POS1 with positioning arrow AR1. Positioning arrow AR1 begins at the origin of the diagram, and ends at time t=4 at the position s=300. After this position, the axis enters a synchronous phase. The synchronous phase is represented by synchronous line SL in synchronous section GEAR. In the synchronous section, the axial movement is represented not only as a fund ion of time but also as a function of a master axis. The velocity of the master axis ($VMS_{master}$=150 mm/s) and the respective unit of measure (distance s in mm) are shown in the upper part of the synchronous section GEAR. Synchronous line SL begins at the end point of positioning arrow AR1 and ends at t=3, s=200 (based on synchronous section GEAR). Changes in velocity of the master axis have a direct influence on the appearance of the diagram. Thus, for example, in the case of a reduction in velocity of the master axis, the width of the synchronous section GEAR will become larger. A time-proportional representation of axial movement in the synchronous section is thus assured.

Positioning section POS2 follows synchronous section GEAR. Positioning arrow AR2 begins at the end point of synchronous line SL and ends at t=3, s=50. FIG. 5 illustrates how additional movement-specific parameters (e.g., the dependence on the velocity of the master axis) can easily be entered into movement diagrams, in addition to the two path and time parameters. The advantage of diagrams such as those shown in FIG. 5 is that positioning and synchronous curves of axes can be represented in a single diagram, and the respective derivatives (velocity, acceleration, rate of change) can be generated from this single representation.

FIG. 5 shows two different types of positioning arrows (AR1 and AR2) in positioning sections POS1 and POS2. The solid positioning arrow AR2 is used for positioning an axis in an absolute position, while the empty positioning arrow AR2 with a "+" at the tip is used for moving an axis.

FIG. 6 shows several positioning arrows available to the user for the input of positioning commands. These positioning commands can be made available to a user in the form of a toolbar TB, shortcuts or the like. Subfigure I of FIG. 6 shows a solid arrow with an upper limit used for positioning an axis in an absolute position. Subfigure II of FIG. 6 illustrates a solid arrow with a "+" at the tip which may represent positioning relative to the current position. Subfigure III illustrates an empty arrow with a "+" at the tip for showing movement of an axis. Subfigure IV illustrates a solid arrow with a "+" sign at the tip and a "+" sign in a circle at the beginning. This arrow may be used to describe the combination of a basic motion and a relative positioning as a single action. Subfigure V shows an empty arrow with a "+" at the tip and a "+" in a circle at the beginning, indicating the combination of a basic motion and a movement command.

Subfigure VI shows a cursor available for the positioning and drawing of arrows within diagrams. This cursor appears at the tip of an arrow during drawing or editing of a diagram. The user can position the cursor using input means such as a mouse (M in FIG. 1) and can thus position the respective arrow. Additionally, Subfigure VI shows that an information field belonging to an arrow can be displayed right next to the cursor. Items such as the duration of movements or differences in time and position ($\Delta t$ and $\Delta s$) can be represented in this information field.

Figure 7:
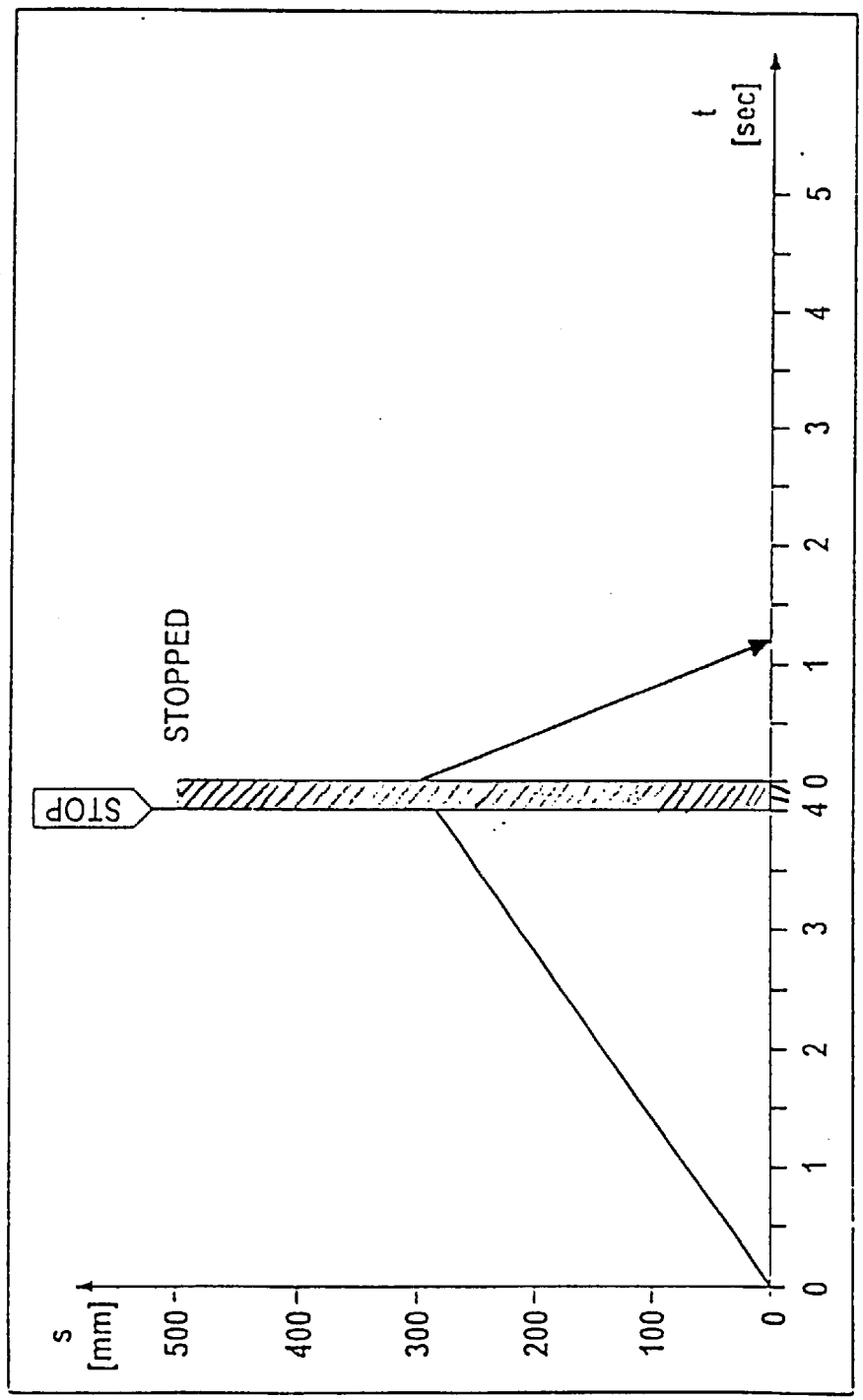
FIG. 7 shows a diagram for the path-time curve in which the axial positioning operation is interrupted by a stop event.

FIG. 7 shows a diagram for a path-time curve, in which an axial positioning process is interrupted by a stop event. Time t (unit: seconds) is plotted on the abscissa and distance s (unit: millimeters) is plotted on the ordinate. The stop event is illustrated by an arrow and the lettering STOP at the upper edge of the diagram. After the STOP event has occurred, there is a braking phase (shown with hatching). At the end of the braking phase, the remaining axial movement is represented in a new axial section beginning at a new t=0 point of the abscissa.

The STOP event (or any other command) can be parameterized by the user, e.g., by inputting the maximum braking acceleration. The duration of the braking phase is calculated automatically (hatched area). The original motion (an axial curve without a STOP event) can also be represented graphically in a diagram.

Figure 8:
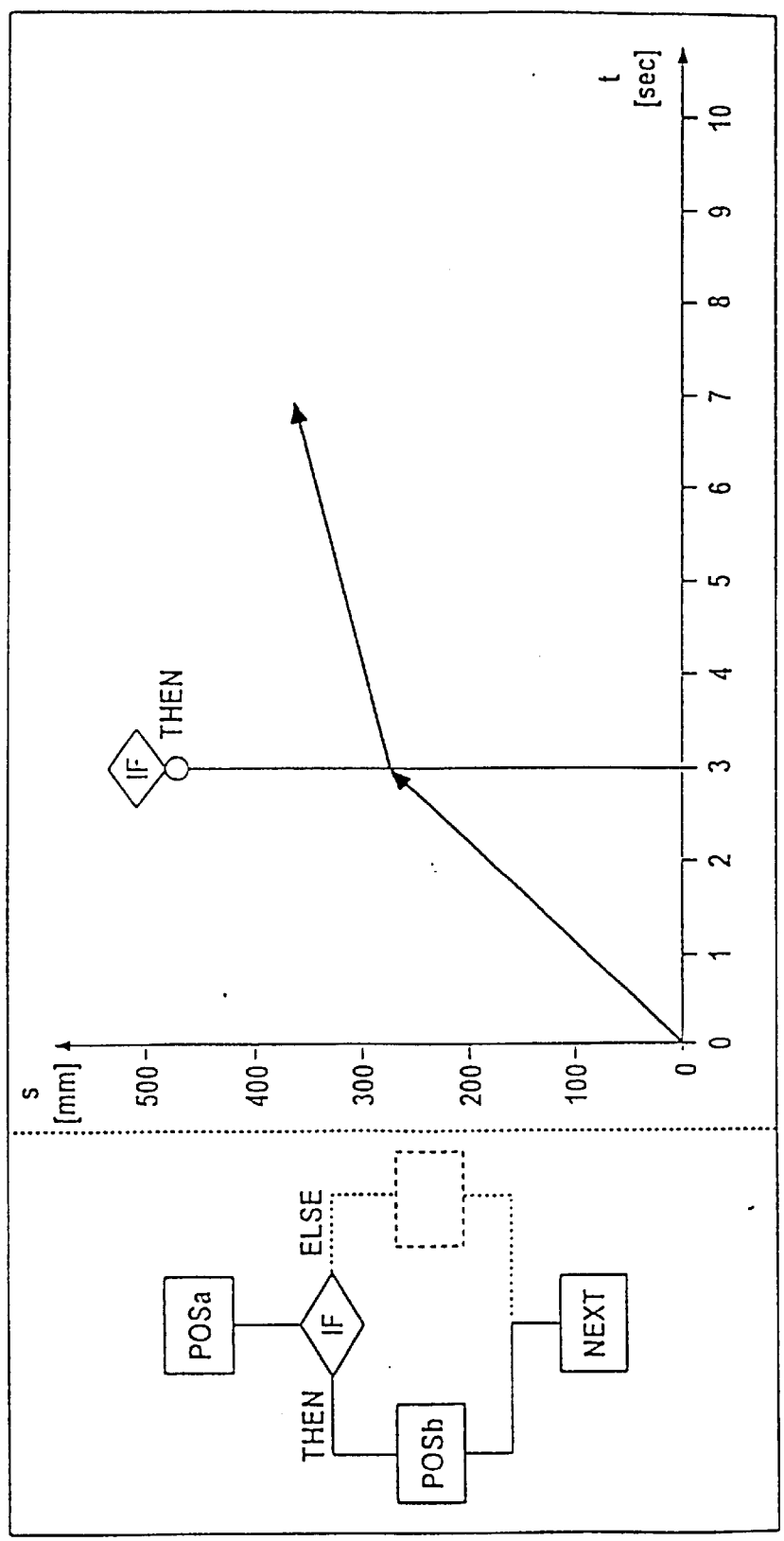
FIG. 8 shows a diagram for the path-time curve in which the axial positioning process is continued with no change as a function of a control instruction.

FIG. 8 illustrates a path-time curve in which an axial positioning process is continued unchanged as a function of a control instruction. The Figure is divided in two sections by a dotted line. The right part of the figure shows a diagram for a path-time curve s=f(t) of an axis. The time t (unit: seconds) is plotted on the abscissa and the distance s (unit: millimeters) is plotted on the ordinate. The control instruction at the upper portion of the diagram is illustrated by a diamond with the notation "IF" and a small circle below the diamond. The notation "IF" indicates that an IF-THEN-ELSE statement is hidden within the control instruction. The continuous black vertical line extending from the small circle beneath the diamond to the abscissa divides the axial movement into two segments, before the control instruction, and after the control instruction.

The left part of FIG. 8 illustrates a control structure (IF-THEN-ELSE) in flow chart notation. After executing a positioning command POSa, a decision is made, depending on the result of the IF query (content of the diamond), as to whether the process should run through the THEN branch or the ELSE branch. The solid line of the flow chart illustrates that the THEN branch has been selected and thus positioning command POSb is executed. The ELSE branch, not executed in this Figure, is shown with dashed lines. The THEN and ELSE branches of the flow chart are combined above the "next" box. The axial motion that would result from the ELSE branch can also be represented graphically in the diagram. The designation THEN (at the right next to the diamond) in the path-time diagram indicates that this is the axial movement resulting from the THEN branch, and not the ELSE branch.

What is claimed is:

1. An input method for visually programming axial movements and events in industrial controllers using a display screen, the method comprising:

(a) displaying an editable blank diagram having a first and second section;
(b) entering a path-time curve in the first section of the diagram for an axial movement;
(c) generating control instructions for executing the axial movement associated with the path-time curve;
(d) displaying the control instructions graphically in the second section of the diagram, wherein the graphical display comprises a display indicator representative of the axial movement illustrated in the path-time curve; and
(e) displaying a control instruction indicator located in the first section of the diagram for indicating control instruction notations illustrated in the path-time curve during the axial movement.

2. The method according to claim 1, wherein the display indicator comprises a dashed line for showing that a control instruction decision branch has not been selected for execution, and a solid line for showing that the control instruction decision branch has been selected for execution.

3. The method according to claim 1, wherein the control instruction indicator comprises a vertical line extending onto a time axis of the path-time curve for indicating the time at which the control instructions occur.

4. The method according to claim 1, wherein the graphical display second section comprises a flow chart notation.

* * * * *